June 12, 1951 G. R. LEPPER 2,557,004
COOLING SYSTEM FOR AUTOMOBILES
Filed Oct. 8, 1948

INVENTOR.
George R. Lepper
BY
Carl F. Eppert
Atty.

Patented June 12, 1951

2,557,004

UNITED STATES PATENT OFFICE 2,557,004

COOLING SYSTEM FOR AUTOMOBILES

George R. Lepper, Chicago, Ill.

Application October 8, 1948, Serial No. 53,569

2 Claims. (Cl. 62—133)

The present invention relates to a novel system for automobiles in which the air transmitted or delivered to the interior or tonneau thereof is cooled and conditioned before its discharge into the automobile.

Among the objects of the present invention is the provision of a novel cooling device placed in the interior of an automobile adjacent the floor and forwardly of the front seat for receiving and cooling the air delivered into the automobile.

A further object of the present invention is the provision of a novel means and mechanism for directing, cooling and conditioning the air supplied to the interior of an automobile. The invention comprehends the provision of a receptacle or container for receiving a cooling medium such as cubes or pieces of ice and means for directing the incoming air over this cooling medium before being discharged into the interior of the vehicle.

The invention further comprehends a novel system for supplying such cooled and conditioned air to the interior of the automobile regardless of the speed at which the automobile is travelling. Most automobiles of recent manufacture are provided with one or more intakes beneath the dash board for directing air from outside the automobile into the interior thereof for cooling the latter during the warmer weather. The effectiveness of such means is generally dependent upon the speed at which the automobile is travelling and, therefore, when the automobile is travelling at a low rate of speed such as in traffic, or when standing still and the motor operating, there is little or no air drawn or forced into the interior of the automobile and at such times the heat is generally most oppressive. The present invention contemplates supplying the interior with cool air under any and all conditions of use of the automobile.

A further object of the present invention is the provision of a novel cooling device so constructed, arranged and designed that it not only cools and conditions the air but also provides cold storage space for milk, beverages, meats or other food products while on a trip or touring in an automobile.

Further objects are to provide a construction of maximum simplicity, efficiency, economy and ease of assembly and operation, and such further objects, advantages and capabilities as will later more fully appear and are inherently possessed thereby.

The invention further resides in the novel construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

Figure 1:
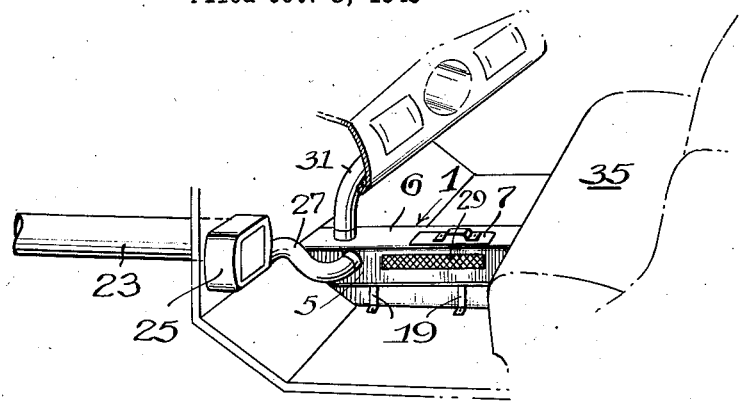
Figure 1 is a fragmentary view in perspective of the interior of an automobile and of the present novel cooling system mounted therein forwardly of the front seat.
Figure 2:
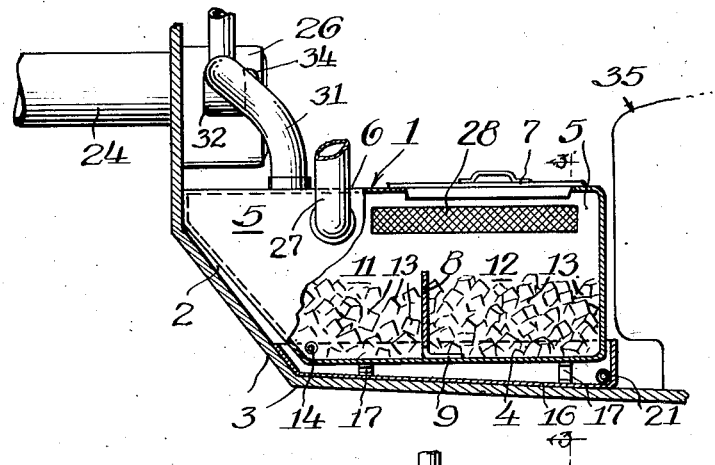
Fig. 2 is a fragmentary enlarged view, part in vertical cross section and part in side elevation, of the novel cooling system and attachment.
Figure 3:
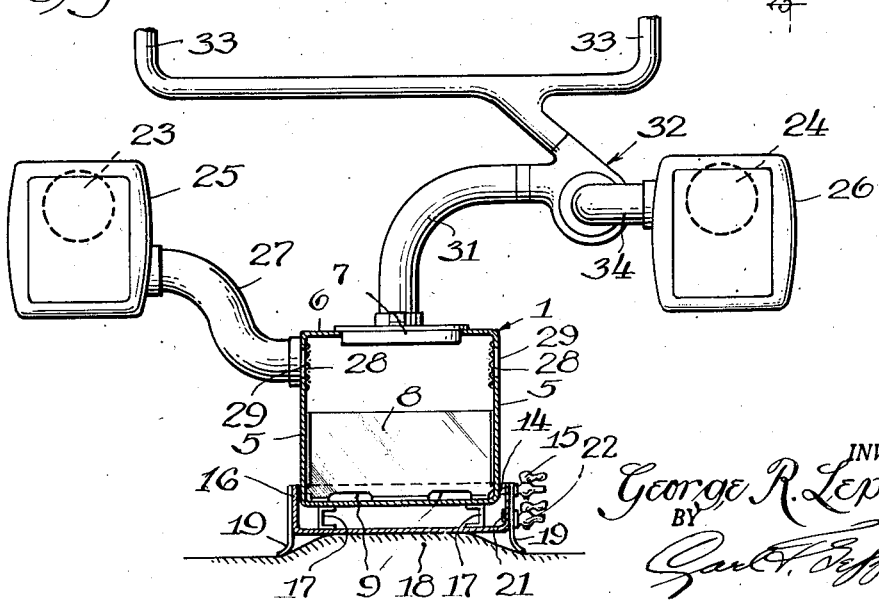
Fig. 3 is a view in vertical cross section taken transversely of the device in a plane represented by the line 3—3 of Fig. 2, and showing in front elevation the means and manner of directing the incoming air into the cooling receptacle and from which it is discharged into the interior of the automobile.

Referring more particularly to the novel illustrative embodiment shown in the drawing, the cooling system and attachment comprises an elongated tank or receptacle 1 disposed longitudinally of the automobile and having a forward wall 2 inclined in substantial conformity with the floor boards 3, a base 4, side walls 5 and a top 6 having an opening normally closed by a removable closure 7. The interior of the receptable or container 1 is divided laterally by a transverse partition 8 secured to the base 4 by spaced lugs or projections 9 to provide separate compartments 11 and 12 for receiving cubes or pieces of ice 13 for cooling the air. The partition divides the ice and prevents it from shifting, but the lower edge thereof is sufficiently elevated above the base 4 to allow any water collecting in the receptacle to flow beneath the partition.

Provision is made for draining the water from the tank or receptacle 1. This is accomplished by slightly inclining the base 4 and at the inclined end providing a drain 14 having a pet cock 15 for draining off any water collecting in the tank. The tank or receptacle in turn is mounted within a drip pan 16 in which collects any condensate from the tank. The tank is spaced from the drip pan by legs or brackets 17 and the drip pan is contoured to conform to the slope or inclination of the floor 3 of the automobile and is supported upon the hump or curved rise 18 in the floor by depending projections or legs 19. At its lowermost end there is provided a drain or outlet 21 and a pet cock 22 for discharging the condensate into a separate receptacle or to a hose leading to the exterior of the automobile.

In the illustrative embodiment, the novel cooling attachment and system for use in warm weather is shown as connected to the air inlets which form standard equipment on numerous models of automobiles now in use and in production. Suitable controls are provided for closing or disconnecting these air tubes during cool or cold weather. As disclosed in the drawings, such automobiles are equipped with air inlet tubes or conduits 23 and 24 at the opposite sides of the engine which lead into the interior of the automobile from preferably adjacent the front of the hood. The air from each of these inlet tubes or conduits 23 and 24 is directed into a box-like receptacle 25 or 26, respectively, from which it is usually directed downwardly or outwardly by controlled louvers or deflectors.

The present invention comprehends the provision of a connecting tube or conduit 27 leading from the receptacle 25 into a side wall 5 of the tank 1 adjacent the upper end thereof, from where the air passes over the cubes or pieces of ice 13 and then the cooled and humidified air is discharged outwardly into the automobile through the perforations in the screens 28 covering the side openings 29, or through the opening in the top 6 when the cover or closure 7 is removed or omitted.

As the quantity of air passing through the air tubes 23 and 24 in warm weather normally depends upon the speed of travel of the automobile, when it is travelling at a low rate of speed or when the motor is operating and the automobile is standing still as frequently occurs in relatively heavy traffic, there is a little or no air circulated through the air tubes and at such times the heat within the automobile is generally most oppressive. In order to cool the interior of the automobile at such times, the invention comprehends the provision of means for drawing or forcing air into the tank 1, cooling it and circulating the cooled and humidified air to the interior of the automobile. This is accomplished by connecting a tube or conduit 31 to the exhaust side of the defroster fan 32 normally supplying the defroster tubes 33 leading to the interior of the windshield, and which fan is connected to and receives its air supply from the receptacle 26 through the pipe or conduit 34. The tube or conduit 31 is shown as connected to the top of the tank 1 for directing the air downwardly onto and over the cooling medium or ice 13, from where it passes outwardly through the screens or perforated coverings 28 and cools the interior of the automobile.

As will appear from the drawing, the tank 1 is disposed longitudinally of the chassis and substantially intermediate the occupants of the front seat 35, and is of such dimensions that bottles of milk or refreshments, food, etc., may be placed therein and kept cold during a trip.

In view of the fact that substantially all models of automobiles are provided with some means of directing air into the interior of the automobile from beneath the dash in an attempt to cool such interior during warm weather, it will be appreciated that the present system of air cooler and conditioner lends itself readily to directing the air by the tubes or hose connections into the tank 1 containing the cooling medium, and then outwardly into the interior of the automobile. The present device may be employed as an attachment for installation in automobiles now in use as well as for installation as original equipment in new automobiles.

The present device permits the windows of the automobile to be substantially closed except for a relatively narrow opening at the top to permit circulation. This prevents the entrance of moisture, dust and foreign particles and also eliminates to a substantial degree exterior noises. The tank and drip pan may be formed or fabricated of metal, plastic or any other material suitable for the purpose and any condensate forming on the tank augments the cooling effect and assures cooling and humidifying the air adjacent the feet of the operator and occupants.

Having thus disclosed the invention, I claim:

1. In a cooling and air conditioning system for automobiles including a pair of air ducts discharging into the interior of an automobile for supplying thereto air from the exterior, a defroster fan receiving air from one of said ducts and supplying it to the interior of the windshield, a receptacle disposed within the automobile adjacent the front seat, a conduit connected at one end to the exhaust side of the defroster fan and at its other end discharging into the receptacle, a second conduit connected to the other air duct and also discharging into the receptacle, a cooling medium such as ice supplied to the receptacle and over which the air from said conduits is directed, and one or more discharge ports in said receptacle for directing and discharging the air into the interior of the automobile after its passage through the receptacle and over the cooling medium.

2. In a cooling and air conditioning system for the interior of an automobile, an air duct receiving air from the exterior of and directing it into the automobile, a tank removably mounted on the floor of the automobile forwardly of the front seat so as to be disposed between the operator and another occupant of the front seat and adapted to receive a refrigerant in the interior of the tank, outlet ports in the sides of the tank opening toward the occupants of the front seat, a blower connected to the air duct, an air tube connected to the exhaust side of the blower for supplying air under pressure to the upper part of the tank and directing it over the refrigerant and then discharging the cooled air outwardly through the ports and into the interior of the automobile, said tank having a base and forward wall substantially conforming to the floor of the automobile and being normally closed except for the opening for air entering from the air tube, the outlet ports opening and directing the air laterally toward the occupants of the front seat and an access opening sufficiently large to receive the refrigerant as well as bottles of milk, liquid refreshments, etc. which the occupants desire to take along and maintain at low temperature in the automobile while touring or for use at an outing, and a removable closure for the access opening permitting ready entry to the interior of the tank.

GEORGE R. LEPPER.

REFERENCES CITED

The following references are of record in the file of this patent:

UNITED STATES PATENTS

| Number | Name | Date |
|--------|------|------|
| 203,236 | Bate | May 7, 1878 |
| 240,658 | Chase | Apr. 26, 1881 |
| 493,321 | Weis | Mar. 14, 1893 |
| 679,108 | Clarke | July 23, 1901 |
| 1,448,071 | Lawson | Mar. 13, 1923 |
| 1,627,361 | Watt | May 3, 1927 |
| 2,007,690 | Nystrom | July 9, 1935 |
| 2,060,482 | Ballman | Nov. 10, 1936 |
| 2,088,323 | Hunter | July 27, 1937 |
| 2,111,070 | Kubias | Mar. 15, 1938 |
| 2,186,562 | Sperry | Jan. 9, 1940 |
| 2,202,954 | Lager | June 4, 1940 |
| 2,248,983 | Gleason | July 15, 1941 |
| 2,318,222 | Heisler | May 4, 1943 |